(12) United States Patent
Fogwill et al.

(10) Patent No.: US 12,013,380 B2
(45) Date of Patent: Jun. 18, 2024

(54) SYSTEM AND METHOD FOR CONTROLLING FLUID FLOW WITHIN A LIQUID CHROMATOGRAPHY SYSTEM

(71) Applicant: Waters Technologies Corporation, Milford, MA (US)

(72) Inventors: Michael O. Fogwill, Uxbridge, MA (US); Theodore A. Dourdeville, Falmouth, MA (US)

(73) Assignee: Waters Technologies Corporation, Milford, MA (US)

( * ) Notice: Subject to any disclaimer, the term of this patent is extended or adjusted under 35 U.S.C. 154(b) by 85 days.

(21) Appl. No.: 17/731,318

(22) Filed: Apr. 28, 2022

(65) Prior Publication Data

US 2022/0252558 A1    Aug. 11, 2022

Related U.S. Application Data

(62) Division of application No. 16/425,057, filed on May 29, 2019, now Pat. No. 11,340,198.

(Continued)

(51) Int. Cl.
*G01N 30/38* (2006.01)
*G01N 30/16* (2006.01)
(Continued)

(52) U.S. Cl.
CPC ............ *G01N 30/38* (2013.01); *G01N 30/16* (2013.01); *G01N 30/32* (2013.01); *G01N 30/6017* (2013.01); *G01N 30/606* (2013.01); *G01N 2030/326* (2013.01); *G01N 2030/328* (2013.01); *G01N 2030/385* (2013.01)

(58) Field of Classification Search
CPC .. G01N 30/02; G01N 30/38; G01N 2030/382; G01N 2030/385; G01N 30/40; G01N 30/10; G01N 2030/201; G01N 2030/202
See application file for complete search history.

(56) References Cited

U.S. PATENT DOCUMENTS

2016/0375376 A1* 12/2016 Wikfors ............... B01D 15/163
422/537

FOREIGN PATENT DOCUMENTS

WO    2018022958 A1    2/2018

OTHER PUBLICATIONS

Andersson et al. "On-line gas chromatographic analysis of higher alcohol synthesis products from syngas." J. Chromatogr. A. 1247(2012): 134-145.

(Continued)

*Primary Examiner* — Ryan B Huang
(74) *Attorney, Agent, or Firm* — WOMBLE BOND DICKINSON (US) LLP; Deborah M. Vernon

(57) ABSTRACT

The present disclosure relates to methodologies, systems, and apparatus for controlling fluid flow within a chromatography system. The chromatography system includes a mobile phase pump configured to pump a liquid mobile phase through a column and a restrictor positioned downstream of the column and upstream of a detector. The system also includes a valve configured to operate in at least two positions. In a first position, the valve is configured to direct the output of the column to bypass the valve and reach the detector, while in the second position the valve directs the output of the column to waste.

13 Claims, 9 Drawing Sheets

Related U.S. Application Data

(60) Provisional application No. 62/677,857, filed on May 30, 2018.

(51) Int. Cl.
 *G01N 30/32* (2006.01)
 *G01N 30/60* (2006.01)

(56) References Cited

OTHER PUBLICATIONS

International Search Report and Written Opinion issued in International Application No. PCT/IB2019/054461 dated Oct. 14, 2019.
Pascual et al. "Development of a Precolumn Capillary Liquid Chromatography Switching System for Coupling to Mass Spectrometry." J. Microcolumn Sep. 8.6(1996): 383-387.

* cited by examiner

SYSTEM AND METHOD FOR CONTROLLING FLUID FLOW WITHIN A LIQUID CHROMATOGRAPHY SYSTEM

CROSS-REFERENCE TO RELATED APPLICATION

This application is a divisional of U.S. patent application Ser. No. 16/425,057 filed May 29, 2019, which claims benefit of and priority to U.S. Provisional Patent Application No. 62/677,857 filed May 30, 2018. The contents of each application are incorporated herein by reference in their entirety.

FIELD OF THE TECHNOLOGY

The present disclosure generally relates to fluid systems used in chromatography. In particular, the present disclosure relates to systems and methods for diverting mobile phase flow within a liquid chromatography system.

BACKGROUND

Chromatography involves the flowing of a mobile phase over a stationary phase to effect separation. A detection system downstream of the separation is utilized to detect and analyze the separated sample. Chromatography systems often use a restrictor to interface to the detection system. The restrictor can be used to maintain system pressure and to regulate or introduce a portion of the mobile phase flow to the detection system.

SUMMARY

Diverting mobile phase flow within a liquid chromatography (LC) system raises a number of challenges, especially when dealing with fluid valves that have a larger fluidic volume and form factor than other components of the chromatography system. Technology for smoothly redirecting mobile phase flow without positioning a valve inline between the column and a detector would be beneficial and highly desirable.

According to one aspect of the present technology, the disclosure relates to a method for controlling fluid flow within a liquid chromatography system. The method includes operating a fluid valve in fluid communication with a makeup pump, an output of a chromatography column, and a channel to waste in a first position configured to divert a makeup fluid through the fluid valve to join the output of the chromatography column. The method also includes directing the output of the chromatography column, when the fluid valve is in the first position, to bypass the fluid valve and flow through a restrictor and to a detector, wherein the restrictor is located downstream of the column, downstream of the fluid valve, and upstream of the detector. The method also includes operating the fluid valve in a second position configured to divert the makeup fluid through the fluid valve directly upstream of the restrictor in order to create a backflow at the restrictor and divert the output of the chromatography column to waste via the fluid valve. In a non-limiting example, the makeup pump is configured to pump the makeup fluid at a rate greater than the maximum flow rate of the restrictor when the fluid valve is operating in the second position. In another non-limiting example, the makeup pump is configured to pump the makeup fluid at a rate lower than the maximum flow rate of the restrictor when the valve is operating in the first position. In another non-limiting example, the detector is a mass spectrometer. In another non-limiting example, the method also includes controlling the operation of the fluid valve in order to selectively direct the output of the column to bypass the fluid valve and reach the detector at predetermined portions of a chromatographic run.

According to another aspect of the present technology, the disclosure relates to a method for controlling fluid flow within a liquid chromatography system. The method includes diverting a portion of an output of a chromatography column to a valve using a tee positioned upstream of a first restrictor having a first pressure drop value, wherein the first restrictor is positioned upstream of a detector. The method also includes operating the valve in a first position configured to direct the portion of the output of the chromatography column to waste through a second restrictor having a second pressure drop value greater than the first pressure drop value. The method also includes operating the valve in a second position configured to direct the portion of the output of the chromatography column to waste through a third restrictor having a third pressure drop value lower than the first pressure drop value. In a non-limiting example, operating the valve in the first position directs a majority of the output of the chromatography column to bypass the valve and reach the detector. In another non-limiting example, operating the valve in the second position directs a majority of the output of the chromatography column to waste. In another non-limiting example, the method also includes controlling the operation of the valve in order to selectively direct a majority of the output of the chromatography column to bypass the valve and reach the detector at predetermined portions of a chromatographic run. In another non-limiting example, the first pressure drop value and the second pressure drop value have a 1:100 ratio, and substantially 99% of the output of the chromatography column bypasses the valve and is directed to the detector when the valve is operating in the first position. In another non-limiting example, the first pressure drop value and the third pressure drop value have a 100:1 ratio, and substantially 99% of the output of the chromatography column is directed to waste via the third restrictor.

According to another aspect of the present technology, the disclosure relates to a system for controlling fluid flow within a chromatography system. The system includes a mobile phase pump configured to pump a liquid mobile phase through a chromatography column. The system also includes a first restrictor positioned downstream of the chromatography column and upstream of a detector. The system also includes a valve in fluid communication with an output of the chromatography column, wherein the valve is not in a direct flow path between the chromatography column and the detector. The system also includes a computing device configured to control an operation of the valve in order to: operate the valve in a first position configured to direct the output of the chromatography column to bypass the valve and reach the detector; and operate the valve in a second position configured to direct the output of the chromatography column to waste. In a non-limiting example, the system can also include a makeup pump configured to pump a makeup fluid into the chromatography system downstream of the chromatography column and upstream of the first restrictor. In another non-limiting example, the makeup pump is configured to pump the makeup fluid at a flow rate that is less than a maximum flow rate of the first restrictor when the valve is operating in the first position. In another non-limiting example, the makeup pump is configured to pump the makeup fluid at a flow rate that is greater than a maximum flow rate of the first restrictor when the valve is operating in the second position in order to generate a backflow of the makeup fluid upstream of the first restrictor. In another non-limiting example, the valve is configured in the first position to divert a portion of output of the column to waste through a second restrictor having a pressure drop value much greater than the first restrictor. In another non-limiting example, the valve is configured in the second position to divert a portion of output of the column to waste through a third restrictor having a pressure drop value much less than the first restrictor.

According to another aspect of the present technology, the disclosure relates to a system for controlling fluid flow within a chromatography system. The system includes a mobile phase pump configured to pump a liquid mobile phase through a chromatography column. The system also includes a first restrictor positioned downstream of the chromatography column and upstream of a detector. The system also includes a valve in fluid communication with an output of the chromatography column, wherein the valve is not in a direct flow path between the chromatography column and the detector, the valve configured to operate in a first position configured to direct the output of the chromatography column to bypass the valve and reach the detector or to operate in a second position configured to direct the output of the chromatography column to waste. In a non-limiting example, the system can also include a makeup pump configured to pump a makeup fluid into the chromatography system downstream of the chromatography column and upstream of the first restrictor; wherein the makeup pump is configured to pump the makeup fluid at a flow rate that is less than a maximum flow rate of the first restrictor when the valve is operating in the first position, and is configured to pump the makeup fluid at a flow rate that is greater than a maximum flow rate of the first restrictor when the valve is operating in the second position in order to generate a backflow of the makeup fluid upstream of the first restrictor. In another non-limiting example, the system can include a second restrictor having a pressure drop value much greater than the first restrictor, and a third restrictor having a pressure drop value much less than the first restrictor; wherein the fluid valve is configured in the first position to divert a portion of the output of the chromatography column to waste through the second restrictor, and in the second position to divert a portion of the output of the chromatography column to waste through the third restrictor.

The above aspects of the technology provide numerous advantages. For example, systems and methods of the present technology allow for flow splitting without the need for a valve directly in the flow line to the detector. Examples of the present technology also allow flow diversion to be implemented with lower post-column volume than previous techniques. The present technology can also reduce post-column system dispersion because the valve is no longer positioned within the analytical elution path.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

One of ordinary skill in the art will understand that the drawings primarily are for illustrative purposes and are not intended to limit the scope of the inventive subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

Figure 1A:
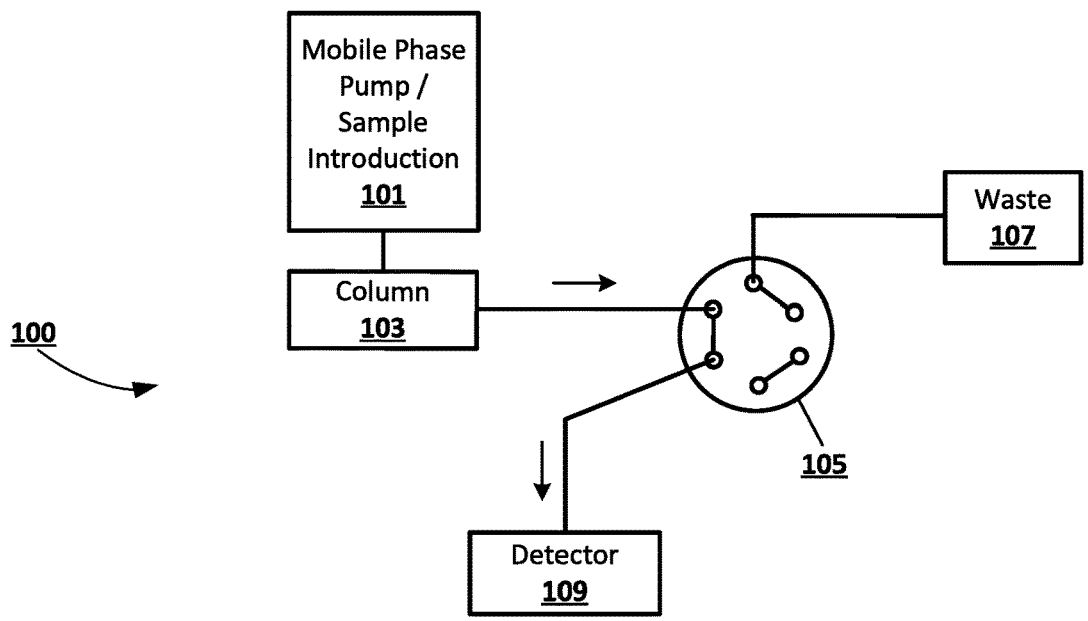
FIGS. 1A-1B illustrate an example block diagram of a prior art chromatography system that utilizes a valve to direct the output of a chromatography column either to waste or to a detector.

The features and advantages of the present disclosure will become more apparent from the detailed description set forth below when taken in conjunction with the drawings.

DETAILED DESCRIPTION

Following below are more detailed descriptions of various concepts related to, and embodiments of, methodologies, apparatus and systems for controlling fluid flow within a chromatography system. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited to, the term "including" means including but not limited to. The term "based on" means based at least in part on.

A "restrictor" herein refers to a component used in a chromatography system that is used to regulate or decrease flow. In some embodiments a restrictor is also used to interface to a detection component. Non-limiting examples of restrictors include a length of straight, small internal diameter tubing, a tapered restrictor, a converging-diverging restrictor, an integral restrictor, or a fritted restrictor. Non-limiting examples of active restrictors include a variable restrictor, a thermally modulated variable restrictor, or a back pressure regulator.

When coupling chromatography to mass spectrometry (MS), flow diversion is often employed. In some cases, flow diversion only introduces the portion of the chromatographic mobile phase which contains analytes of interest. During other portions of the chromatographic elution, the mobile phase is diverted away from the detector in order to keep the detector as clean as possible longer. In some cases, a simple valve can be employed to direct the flow to and away from the detector. Flow diversion can be used in a coupled LC-MS system to reduce contamination of the MS hardware and to increase the robustness and uptime. In some embodiments, a diverter valve, such as a rotary shear valve, can be plumbed in-line downstream of the chromatography column in order to direct flow into, or away from, the MS inlet. Flow diversion can often be employed in high-throughput applications with 'dirty' sample matrices. The column effluent is typically diverted to waste during the first and last portions of a separation. Highly polar compounds, such as salts, elute at the beginning of a reversed-phase LC separation, being substantially unretained. The last portion of a separation is often a wash step which cleans the column of highly non-polar compounds. In either case, these compound groups have little analytical value and can cause needless contamination of the MS components, such as sampling cones, ion optics, and other inlet components. In cases where severe contamination of MS components has occurred, performance can be significantly compromised, and can ultimately result in complete loss of mass spectrometer signal. A complete tear-down and cleaning of the system may be required to restore normal operation. Such a tear-down implies multiple hours to days of system down-time. Accordingly, it is in the best interest of the analyst to keep the mass spectrometer components as clean as possible, for as long as possible.

Figure 1B:
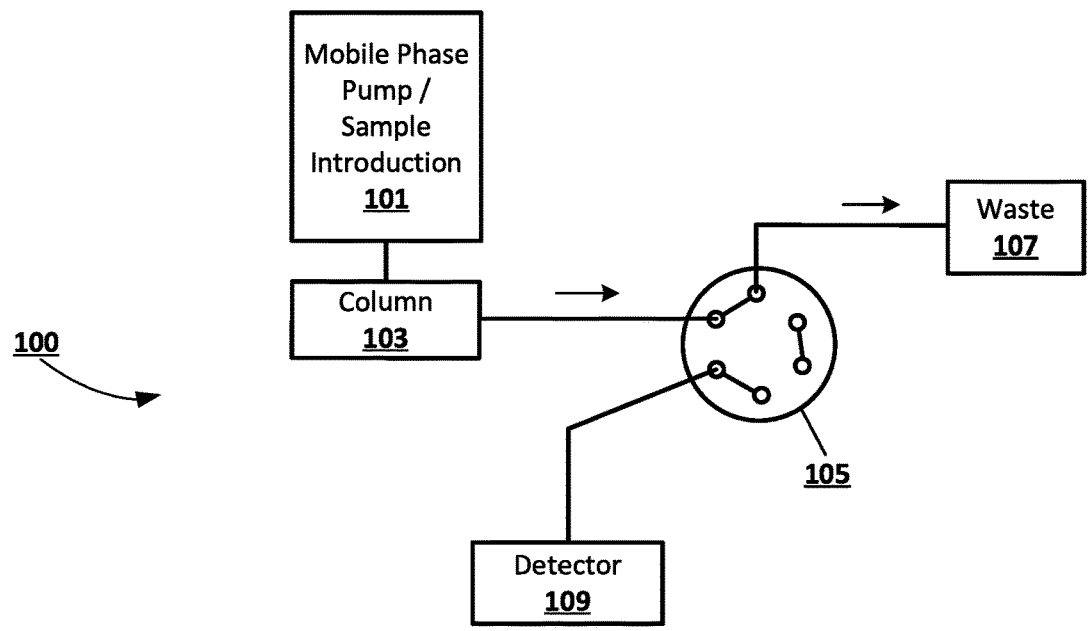

FIGS. 1A-1B illustrate an example block diagram of a prior art chromatography system 100 that utilizes a valve 105, such as a rotary shear valve, to direct the output of a chromatography column 103 either to waste 107 or to a detector 109. The system may include a mobile phase pump or sample introduction component 101 connected to the column 103. During a chromatographic run, the output of the column 103 is often of least interest at the beginning and/or end of the run. In some cases, the valve 105 can direct the output of the column to waste 107 during those time periods of least interest. The valve 105 can include, for example, a simple rotary shear valve. In a non-limiting example, the detector 109 can include a mass spectrometer.

FIG. 1A shows an example embodiment where the system 100 is in a non-divert or flow-through state where the output of the chromatography column 103 is directed through the valve 105 and to the detector 109. FIG. 1B shows an example embodiment where the system 100 is in a diverting state where the output of the chromatography column 103 is directed to waste 107. Such a system can be simple to implement and automate. However, such a system can include additional post-column volume introduced by the fluidics of the divert valve 105. Furthermore, the bulk or large external size of the valve 105 is interposed within the space-constrained region between the output of the column 103 and the inlet of the detector 109 or mass spectrometer. Furthermore, the detector 109 or spectrometer ion source is running dry (i.e. with zero fluid flow) during the divert operation. The additional post-column fluidic volume of the valve 105 can promote chromatographic band-broadening, thus reducing separation performance. The bulk or large external size of the valve 105 hinders or prevents the implementation of this configuration in space-constrained regions within integrated LC-MS systems. In addition, running a MS ion source inlet dry can cause plugging due to sample/matrix precipitation and/or overheating of ion source components.

Figure 2:
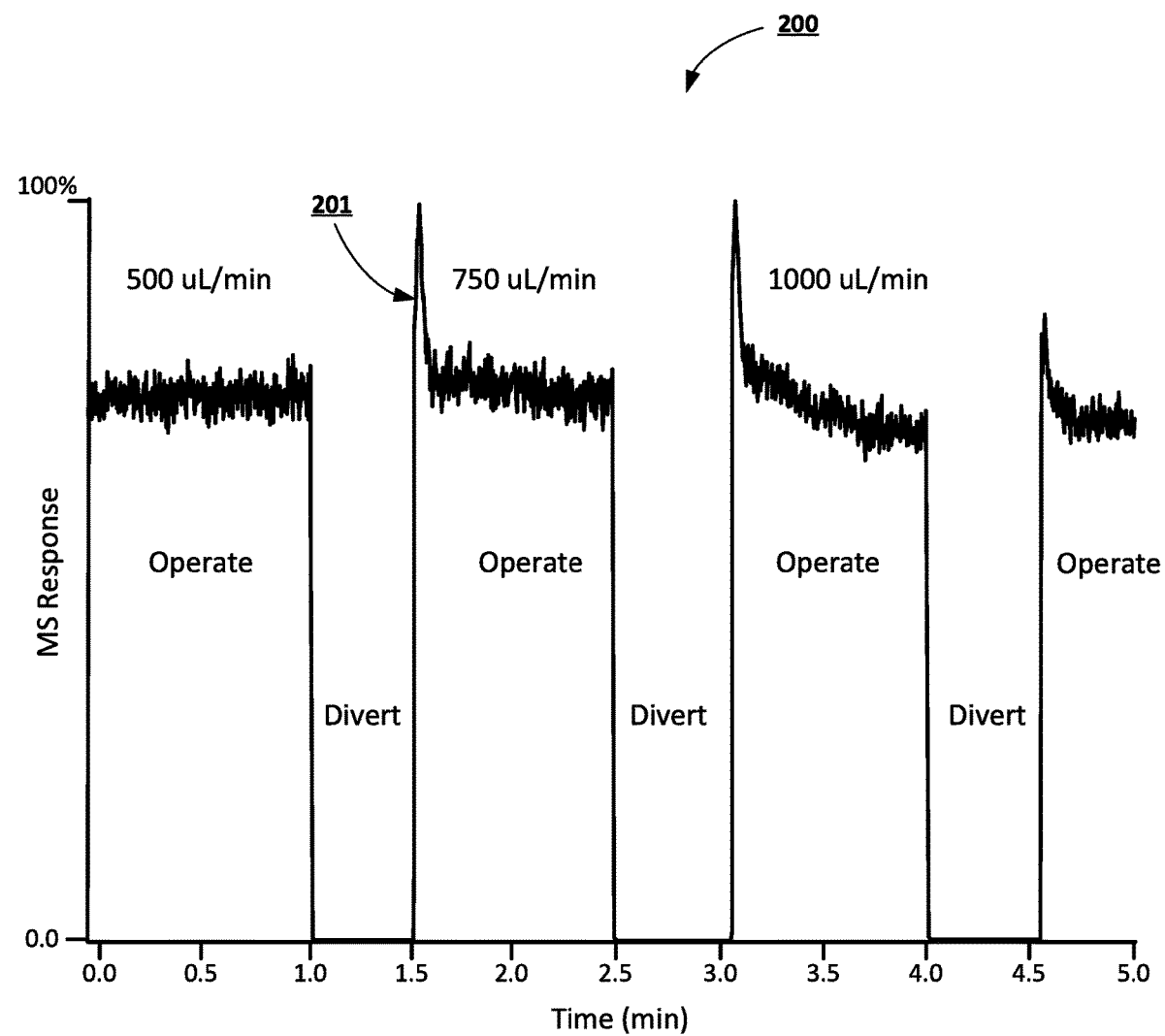
FIG. 2 is a graph showing the MS response to a continuously-infused caffeine sample introduced within the system of FIGS. 1A-1B.

FIG. 2 is a graph 200 showing a trace 201 of the MS response to a continuously-infused caffeine sample introduced at 500, 750, and 1000 µL/min within the system of FIGS. 1A-1B. In this particular example, the system 100 described above in reference to FIGS. 1A-1B is toggled at each flow rate between the operating or flow-through state described in reference to FIG. 1A, and the divert state described in reference to FIG. 1B. As shown in FIG. 2, the drop of signal during the divert state at each flow rate shows excellent performance of the divert system. The reduction of signal is proportional to the amount of sample directed away from the MS. In this case, absence of response implies a 100%-effective divert system.

As discussed above, however, this approach can consume significant space within one of the most space-constrained regions of a chromatography system. Implementing the divert valve in-line can also impart an undesired amount of post-column fluidic volume arising from the valve hardware, the intervening tubing, and the multiple fluidic connections. According to embodiments of the present invention, a low-volume solid-state post column diversion system is disclosed which can be implemented within significantly smaller spaces.

Figure 3A:
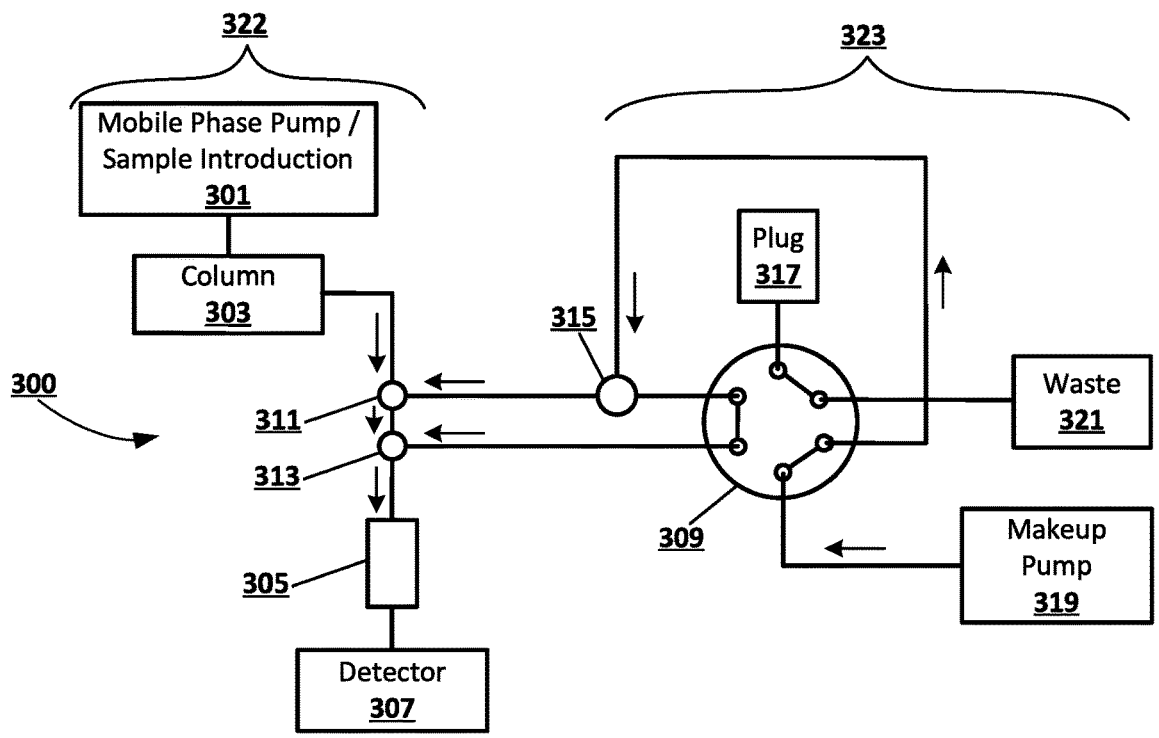
FIGS. 3A-3B show a block diagram of a novel flow-divert system employing a makeup pump and a restrictor, according to an embodiment of the present disclosure.
Figure 3B:
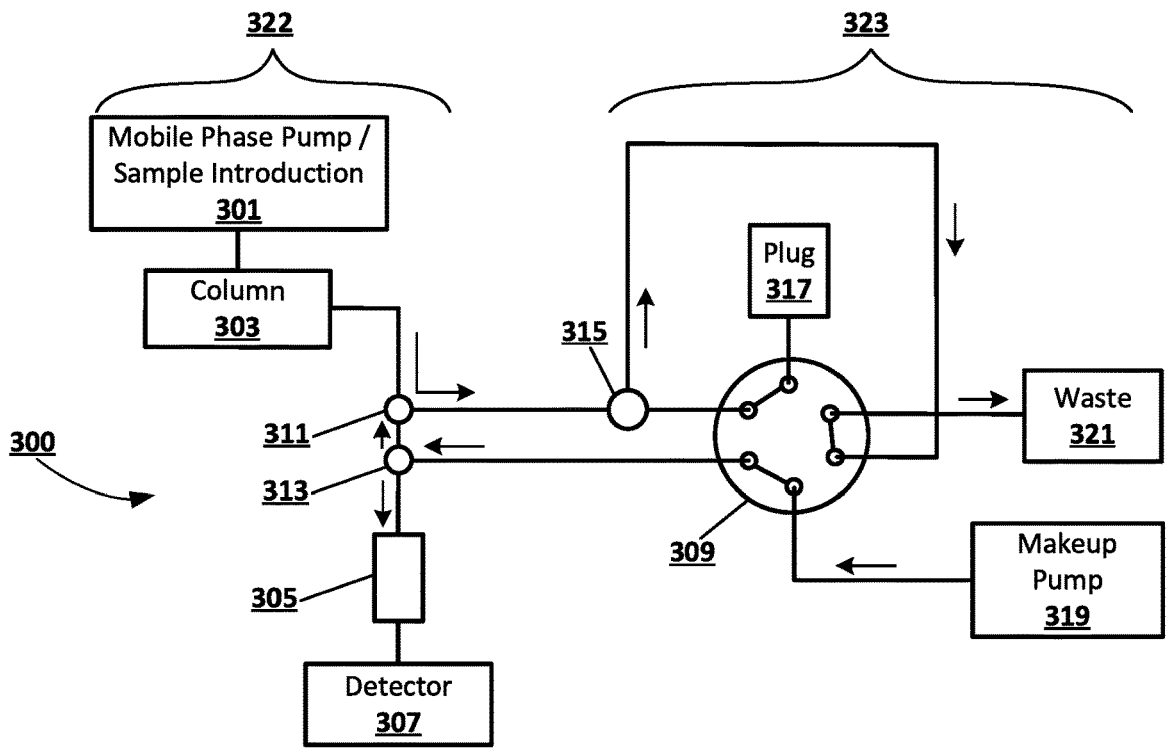

FIGS. 3A-3B show a block diagram of a novel flow-divert system 300 employing a makeup pump 319 and a restrictor 305, according to an embodiment of the present disclosure. In this particular embodiment, the system 300 includes a mobile phase pump or sample introduction component 301, a chromatography column 303, a restrictor 305 positioned upstream of a detector 307 or MS, a set of low volume tees 311, 313 such as nano-tees (i.e. fluid tees that are configured to direct fluid at the nL scale) positioned upstream of the restrictor 305 and in fluid communication with ports in a valve 309. The makeup pump 319 is in fluid communication with the valve 309 such that the output of the makeup pump 319 can be selectively directed through the valve 309 to the input of the second nano-tee 313 or to the input of the first nano-tee 311 via a third tee 315. In a non-limiting example, the makeup pump 319 is configured to pump a makeup fluid having the same composition as a mobile phase solvent exiting the column 303. When the system 300 is in an operating state, as shown in FIG. 3A, the waste 321 is connected with a plug 317 and the output of the column 303 is directed to the detector 307. However, when the system 300 is in a divert state, as shown in FIG. 3B, the output of the column 303 is directed to waste 321 through the third tee 315 and the valve 309.

In a non-limiting example, the makeup pump 319, valve 309, and third tee 315 hardware lie along a non-critical flow path to waste 321, rather than in-line between the chromatography column 303 and the detector 307. This non-critical flow path is shown in region 323, rather than in region 322 between the column 303 and the detector 307. Thus, each of these components can be positioned in locations-of-convenience anywhere in reasonable proximity to the detector 307 or MS. In this way, these components do not need to occupy highly-critical space directly between the column 303 outlet and the detector 307 inlet, as bandspread within these lines is not a performance consideration.

In the operating state shown in FIG. 3A, the column 303 effluent is directed through the restrictor 305 to the MS detector 307. The makeup pump 319 can operate at a very low flow rate to flush the two side lines and prevent analyte diffusion into the side lines located between the nano-tees 311, 313 and the valve 309 (with concomitant band-broadening and/or sample-carryover effect).

In the divert state shown in FIG. 3B, the column 303 flow is directed to waste 321 due to the backflow created by directing the output of the makeup pump 319 upstream of the restrictor 305 at a flow rate that is higher than the maximum flow rate of the restrictor 305. In this way, only makeup fluid is introduced to the MS and all column effluent is directed to waste 321. The restrictor 305 can be designed to minimize the makeup fluid flow required to effect diversion, while not contributing a large parasitic pressure demand upon the LC system. In another non-limiting example, an optional restrictor could be added to the waste path to prevent all of the combined mobile phase and makeup fluid from flowing to waste. This optional restrictor could be designed to form a restriction bridge with the first restrictor in order to balance the flow and direct some to waste and some to the detector 307. The makeup fluid could still be high enough, in some embodiments, that all mobile phase is directed to waste and only makeup fluid is directed to the detector 307.

Figure 4:
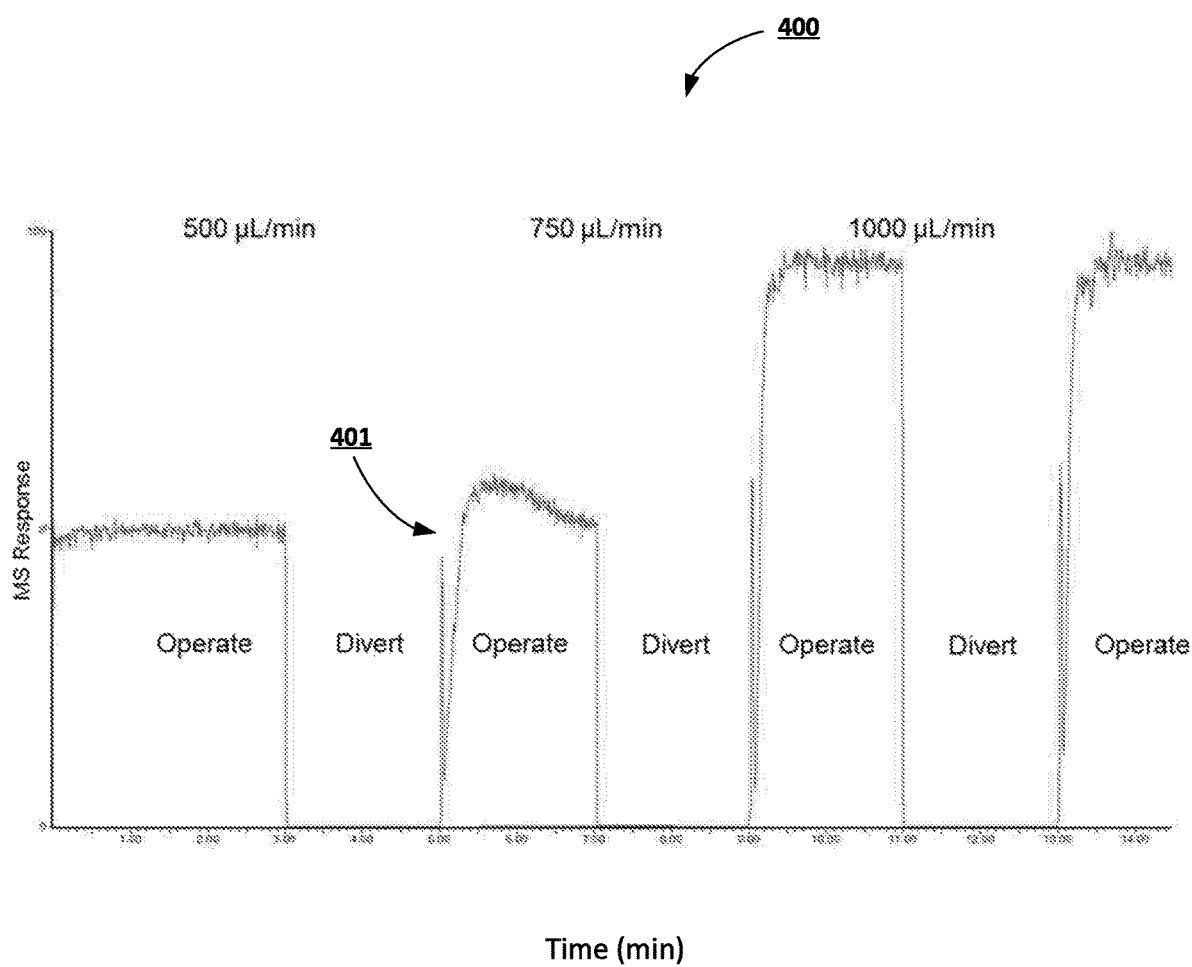
FIG. 4 is a graph showing the MS response to a continuously-infused caffeine sample introduced within the system of FIGS. 3A-3B.

FIG. 4 is a graph 400 showing a trace 401 of the MS response to a continuously-infused caffeine sample introduced at 500, 750, and 1000 µL/min within the system of FIGS. 3A-3B. In this particular example, the system 300 described above in reference to FIGS. 3A-3B is toggled at each flow rate between the operating or flow-through state described in reference to FIG. 3A, and the divert state described in reference to FIG. 3B. As shown in FIG. 4, the drop of signal during the divert state at each flow rate shows excellent performance of the divert system.

Figure 5A:
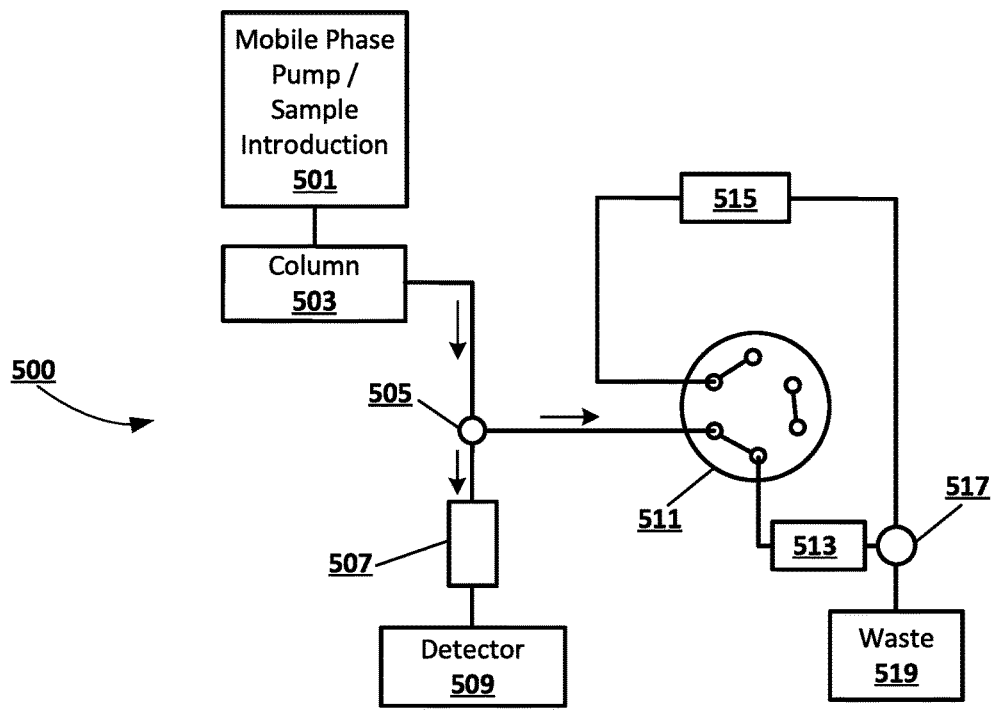
FIGS. 5A-5B show a block diagram of a novel flow-divert system employing restrictors in a flow splitting arrangement, according to an embodiment of the present disclosure.
Figure 5B:
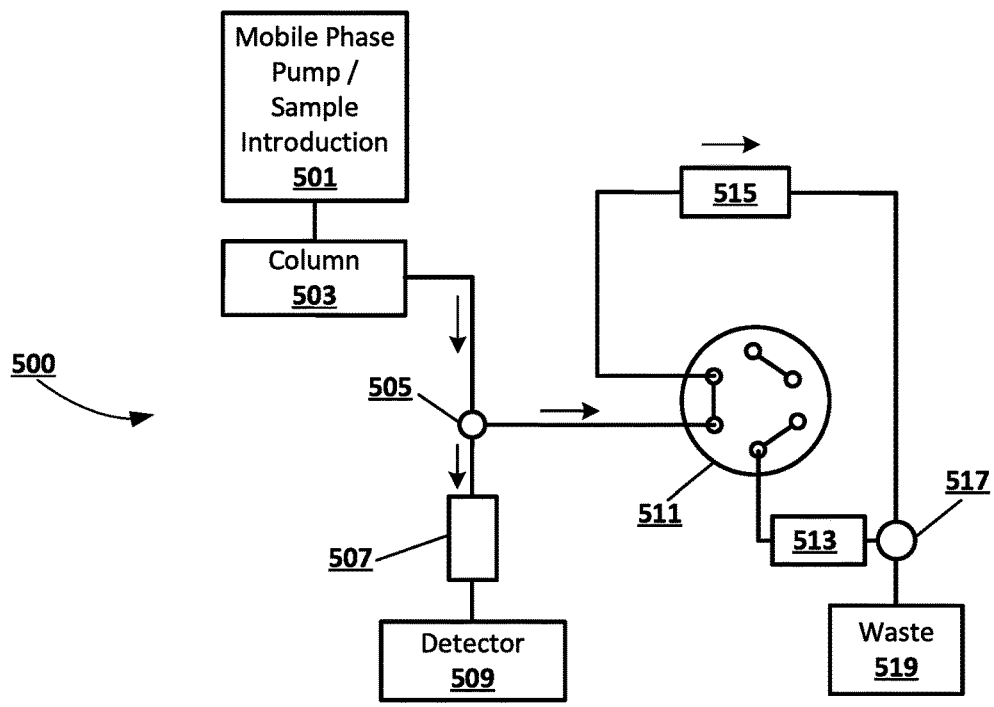

FIGS. 5A-5B show a block diagram of a novel flow-divert system 500 employing restrictors 507, 513, 515 in a flow splitting arrangement, according to an embodiment of the present disclosure. In a non-limiting example, the system includes a mobile phase pump or sample introduction component 501, a chromatography column 503, a small volume tee 505 such as a nano-tee, a first restrictor 507 positioned upstream of a detector 509, and a valve 511 in fluid communication with the nano-tee 505. The waste 519 is in fluid communication with a second tee 517 that is connected to the valve 511 via a second restrictor 513 and a third restrictor 515. In this example embodiment, the second restrictor 513 has a pressure drop much greater than the first restrictor 507, while the third restrictor 515 has a pressure drop much less than the first restrictor 507.

In a non-limiting example, the restrictors 507, 513, 515 are designed to establish a 100:1 split ratio between the MS detector 509 and waste 519. For example, the first restrictor 507 can be configured with a pressure drop of approximately 700 PSI/mL/min (approximately 48.26 bar/mL/min), the second restrictor 513 with a pressure drop of approximately 70,000 PSI/mL/min (approximately 4,826.33 bar/mL/min), and the third restrictor 515 with a pressure drop of approximately 7.0 PSI/mL/min (approximately 0.48 bar/mL/min). According to one example embodiment, the operating state shown in FIG. 5A creates a 100:1 split ratio between the second restrictor 513 and the first restrictor 507, thus directing 99% of the output of the column 503 to the detector 509 via the first restrictor 507. In this example embodiment, 1% of the output of the column is intentionally directed to waste during normal operation in order to prevent analyte diffusion into and out of the side channel (i.e. to prevent peak tailing). In another non-limiting example, the divert state shown in FIG. 5B creates a 100:1 split ratio between the first restrictor 507 and the third restrictor 515, thus directing 99% of the output of the column 503 to waste 519 via the third restrictor 515. In a non-limiting example, the first restrictor 507 can have dimensions of approximately 50 mm×50 µm, the second restrictor 513 can have dimensions of approximately 315 mm×25 µm, and the third restrictor 515 can have dimensions of approximately 41 mm×150 µm. In an alternative embodiment, the waste lines can be two independent lines from the second and third restrictors 513, 515 rather than being tee'd together, as shown in FIGS. 5A-5B.

Figure 6:
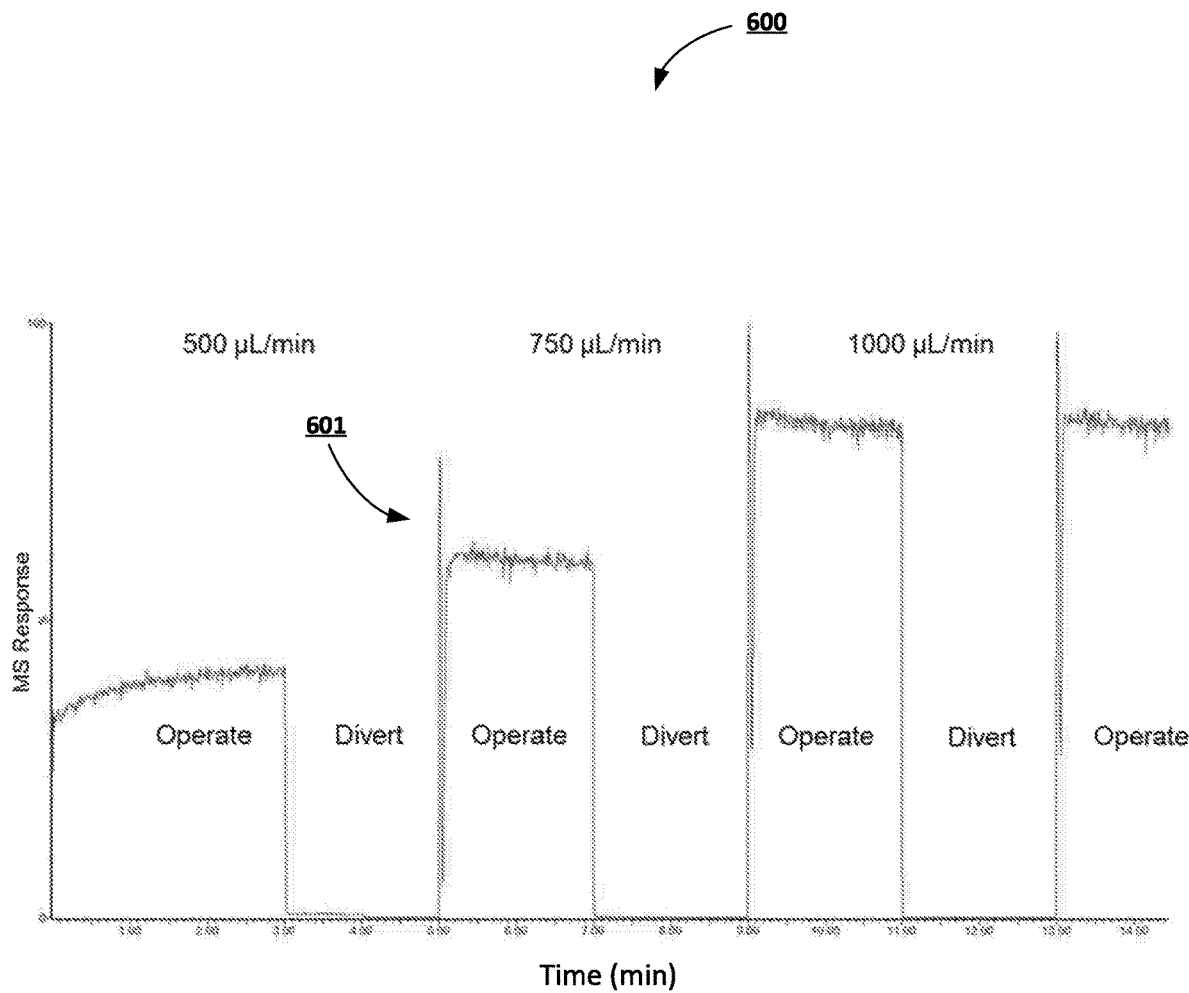
FIG. 6 is a graph showing the MS response to a continuously-infused caffeine sample introduced within the system of FIGS. 5A-5B.

FIG. 6 is a graph 600 showing a trace 601 of the MS response to a continuously-infused caffeine sample introduced at 500, 750, and 1000 µL/min within the system of FIGS. 5A-5B. In this particular example, the system 500 described above in reference to FIGS. 5A-5B is toggled at each flow rate between the operating or flow-through state described in reference to FIG. 5A, and the divert state described in reference to FIG. 5B. As shown in FIG. 6, the drop of signal during the divert state at each flow rate shows excellent performance of the divert system. Some example advantages to this invention include reduced post column system dispersion and the ability to implement a divert functionality within a very limited post-column space such as when a vacuum-jacketed column is placed inside an MS probe, or within a fully integrated LC-MS system, or on a microfluidic separation platform.

Flow-modulated diversion, such as described above in reference to FIGS. 3A-6, can provide a number of advantages such as: (1) low post-column volume, (2) ability to be implemented in systems which are extremely space-constrained just upstream of the ion source (e.g. where a vacuum-jacketed column is located within an MS probe, fully integrated LC-MS systems, or on a microfluidic separation platform), and (3) the spectrometer ion source is always maintained "wet," or with liquid flow. Reduced post column system dispersion can also be accomplished due to the fact that valves are no longer present within the analytical elution path (i.e. in-line with the analytical flow).

Figure 7:
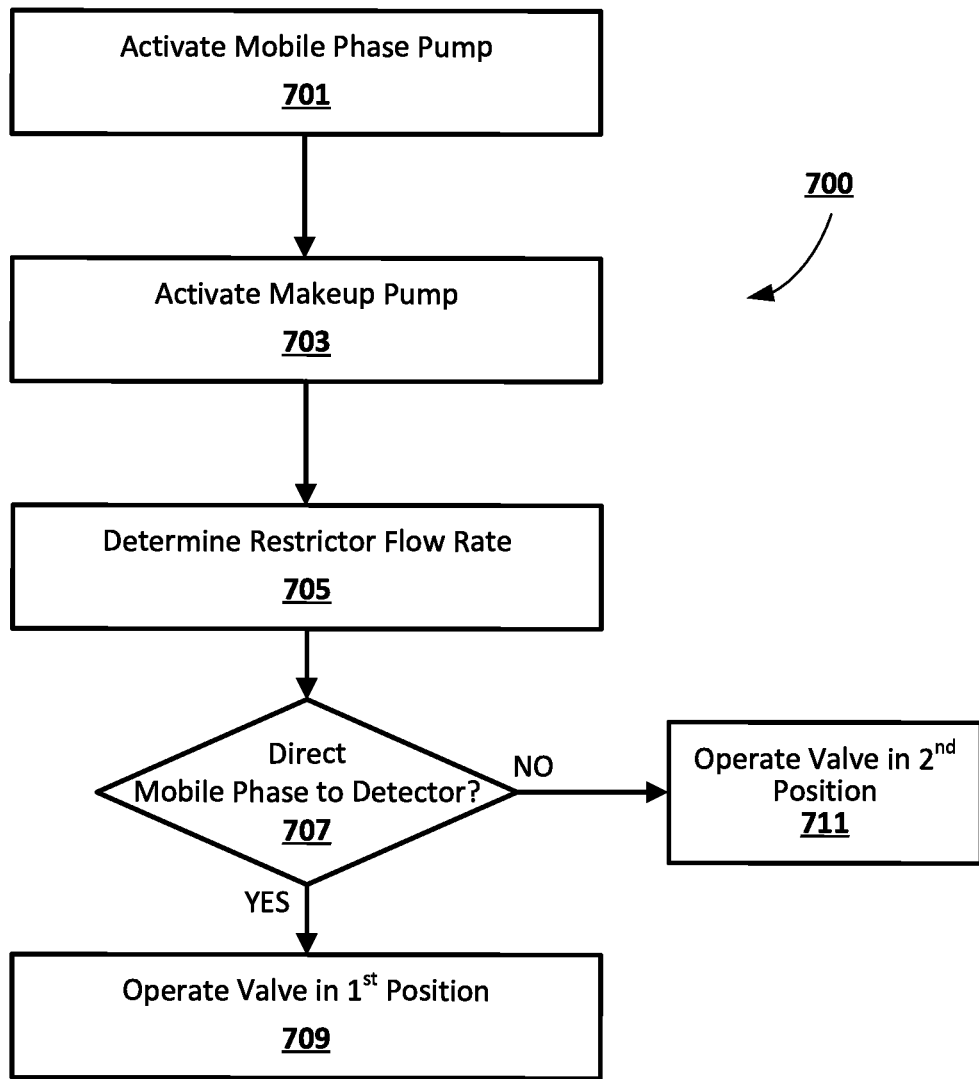
FIG. 7 is a flowchart illustrating an exemplary method for controlling fluid flow within a chromatography system, according to an embodiment of the present disclosure.

FIG. 7 is a flowchart illustrating an exemplary method 700 for controlling fluid flow within a chromatography system, according to an embodiment of the present disclosure. It will be appreciated that the method can be programmatically performed, at least in part, by one or more computer-executable processes executing on, or in communication with, one or more servers or other computing devices such as those described further below. In step 701, the chromatography process is initiated by activating the mobile phase pump. In some example embodiments, the chromatography system is a liquid chromatography system, and the mobile phase pump is configured to pump a mobile phase through a chromatography column.

In step 703, a makeup pump is activated. In a non-limiting example, the makeup pump can be implemented as shown in FIGS. 3A-3B and can be in fluid communication with a valve, such as a rotary shear valve. When activated, the makeup pump can pump a makeup fluid to the fluid valve that is in fluid communication with the output of the chromatography column and a channel to waste. The makeup pump can be configured to pump the makeup fluid at various flow rates, and the flow rate of the makeup pump can be controlled, in some embodiments, by a computing device or pump controller.

In step 705, the maximum flow rate of a restrictor positioned upstream of a detector and downstream of the chromatography column is determined. The detector is also positioned downstream of the fluid valve, as shown in the example embodiments of FIGS. 3A-3B. The detector can be, for example, a mass spectrometer or a flame ionization detector.

In step 707, it is determined whether the mobile phase exiting the chromatography column should be directed to the detector. As discussed above, the output of the column may sometimes be selectively directed to waste at the beginning and end of a chromatographic run, and only directed to the detector at specific times. If it is determined that the output of the chromatography column should be directed to the detector, the method continues in step 709 by operating the valve in the first position configured to divert the makeup fluid through the fluid valve to join the output of the chromatography column. The makeup pump can be directed through the valve and into a first tee 315, as shown in FIG. 3A, and introduced to the output of the chromatography column using a low-volume tee 311 such as a nano-tee. In a non-limiting example, the makeup pump is configured to pump the makeup fluid at a flow rate well below the maximum flow rate of the restrictor when the valve is operating in the first position. This allows the makeup fluid to maintain a small fluid flow within the lines connecting the valve 309 with the low-volume tees 311, 313 as discussed above.

If it is determined that the output of the chromatography column should be directed to waste, the method continues with step 711 and the valve operates in a second position configured to direct the makeup fluid through the fluid valve directly upstream of the restrictor in order to create a backflow at the restrictor and divert the output of the chromatography column to waste via the valve. An example of this second valve position can be seen in FIG. 3B, where the makeup fluid from the makeup pump 319 is introduced directly upstream of the restrictor 305 via a low-volume tee 313 in order to create a backflow of makeup fluid upstream of the restrictor 305. In a non-limiting example, the makeup pump is configured to pump the makeup fluid at a rate greater than the maximum flow rate of the restrictor while the valve is operating in the second position. According to an example embodiment, the method described above allows a user to control the operation of the fluid valve in order to selectively direct the output of the chromatography column to bypass the valve and reach the detector at predetermined portions of a chromatographic run. As will be appreciated, the operation of the fluid valve can be controlled, in some embodiments, using a programmable computer or processing device.

Figure 8:
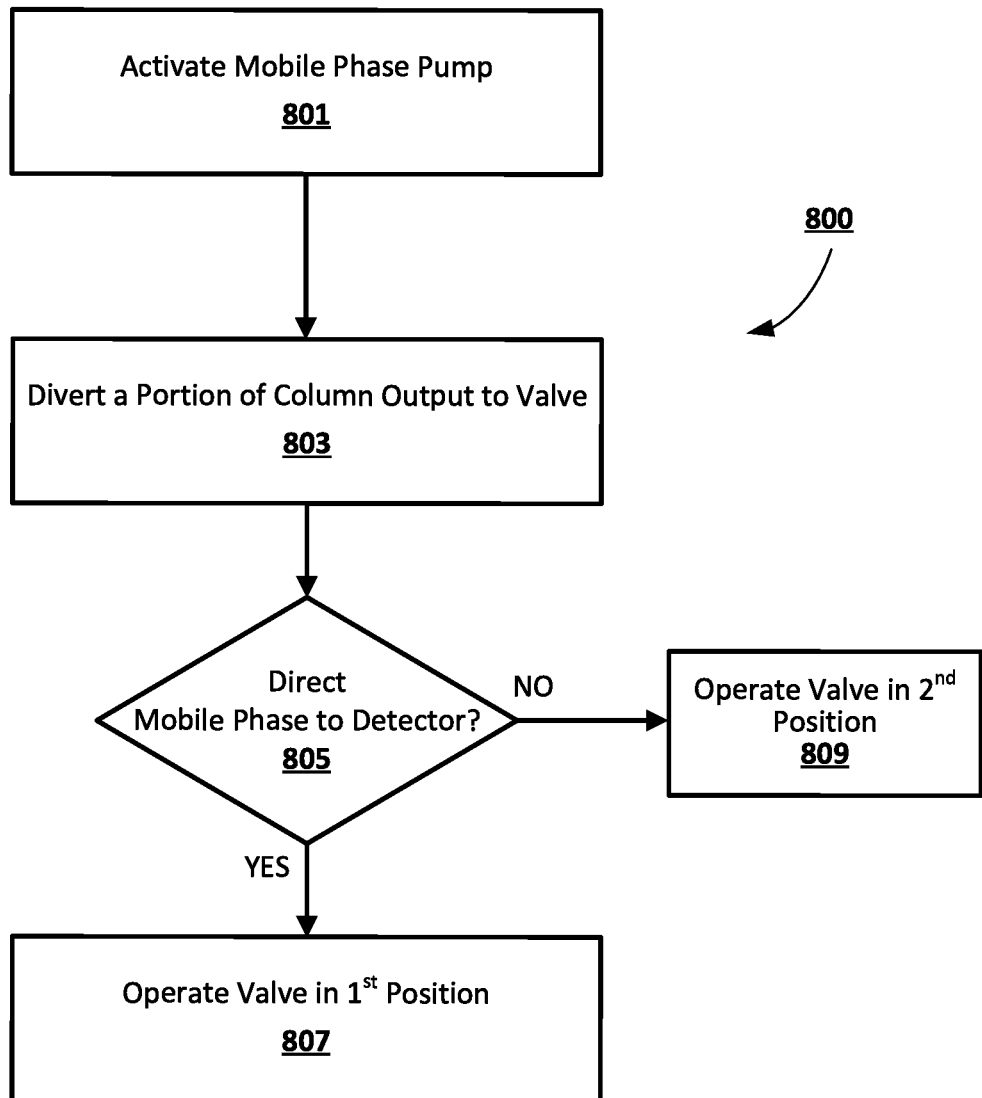
FIG. 8 is a flowchart illustrating another exemplary method for controlling fluid flow within a chromatography system, according to an embodiment of the present disclosure.

FIG. 8 is a flowchart illustrating another exemplary method 800 for controlling fluid flow within a chromatography system, according to an embodiment of the present disclosure. It will be appreciated that the method can be programmatically performed, at least in part, by one or more computer-executable processes executing on, or in communication with, one or more servers or other computing devices such as those described further below. In step 801, the chromatography process is initiated by activating the mobile phase pump. In some example embodiments, the chromatography system is a liquid chromatography system, and the mobile phase pump is configured to pump a mobile phase through a chromatography column.

In step 803, a portion of the output of the column is diverted to a valve. In a non-limiting example, the portion of the output of the column can be diverted using a low-volume tee and the valve can be implemented as shown in FIGS. 5A-5B. As shown in this non-limiting example, the tee 505 can be positioned directly upstream of a first restrictor, and the valve can selectively direct the diverted portion of the output of the column to waste via either a second restrictor or a third restrictor. In a non-limiting example, the pressure drop value across the first restrictor is much lower than the pressure drop value across the second restrictor, and the pressure drop value across the first restrictor is much higher than the pressure drop value across the third restrictor.

In step 805, it is determined whether the mobile phase exiting the chromatography column should be directed to the detector. As discussed above, the output of the column may sometimes be selectively directed to waste at the beginning and end of a chromatographic run, and only directed to the detector at specific times. If it is determined that the output of the chromatography column should be directed to the detector, the method continues in step 807 by operating the valve in the first position configured to direct the diverted portion of the output of the chromatography column to waste through the second restrictor. A non-limiting example of the valve operating in the first position is shown in FIG. 5A, where the portion of the output of the chromatography column diverted at tee 505 away from the first restrictor 507 is directed to waste 519 through the valve 511 and the second restrictor 513. In this particular example, because the pressure drop value across the second restrictor 513 is larger than the pressure drop value across the first restrictor 507, a majority of the output of the chromatography column is directed to the detector 509 through the first restrictor 507. In another non-limiting example, the first pressure drop value associated with the first restrictor and the second pressure drop value associated with the second restrictor have a ratio of 1:100 such that substantially 99% of the output of the chromatography column is directed to the detector when the valve is operating in the first position.

If it is determined that the output of the chromatography column should be directed to waste, the method continues in step 809 by operating the valve in the second position configured to direct the diverted portion of the output of the chromatography column to waste through the third restrictor. A non-limiting example of the valve operating in the second position is shown in FIG. 5B, where the portion of the output of the chromatography column diverted at tee 505 away from the first restrictor 507 is directed to waste 519 through the valve 511 and the third restrictor 515. In this particular example, because the pressure drop value across the third restrictor 515 is less than the pressure drop value across the first restrictor 507, a majority of the output of the chromatography column is directed to waste 519 through the third restrictor 515. In another non-limiting example, the first pressure drop value associated with the first restrictor and the third pressure drop value associated with the third restrictor have a ratio of 100:1 such that substantially 99% of the output of the chromatography column is directed to waste when the valve is operating in the second position.

Figure 9:
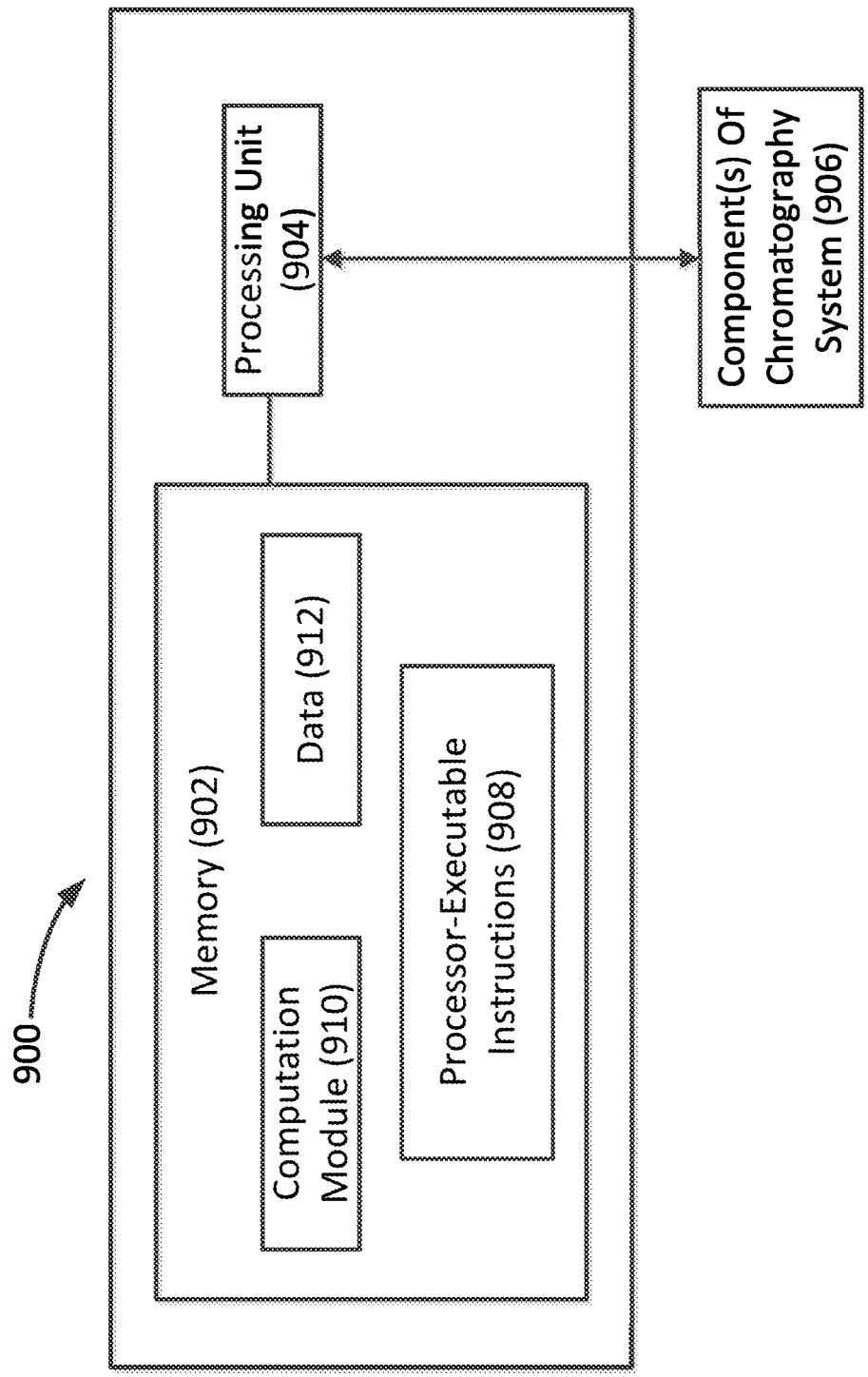
FIG. 9 shows an example system that can be used to perform example processes and computations, according to principles of the present disclosure.

FIG. 9 shows a non-limiting example apparatus 900 that can be used to implement an example method for controlling fluid flow within a chromatography system, according to the principles described herein. The apparatus 900 can include at least one memory 902 and at least one processing unit 904. The processing unit 904 can be communicatively coupled to the at least one memory 902 and also to at least one component of a chromatography system 906, such as the valve, mobile phase pump, makeup pump, or other components described herein.

The memory 902 can be configured to store processor-executable instructions 908 and a computation module 910. In an example method, as described in connection with FIGS. 7-8, the processing unit 904 can execute processor-executable instructions 908 stored in the memory 902 to control the operation of the valve and/or the makeup pump in order to operate the valve in the first or second positions described above and/or increase or decrease the flow rate of the makeup fluid.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methodologies. One of ordinary skill in the art will recognize that example methodologies can include more or fewer steps than those illustrated in the example flowcharts, and that the steps in the example flowcharts can be performed in a different order than the order shown in the illustrative flowcharts.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that inventive embodiments may be practiced otherwise than as specifically described. Inventive embodiments of the present disclosure are directed to each individual feature, system, article, material, kit, and/or method described herein. In addition, any combination of two or more such features, systems, articles, materials, kits, and/or methodologies, if such features, systems, articles, materials, kits, and/or methodologies are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A system for controlling fluid flow within a chromatography system, the system comprising:
    a mobile phase pump configured to pump a liquid mobile phase through a chromatography column;
    a first restrictor positioned downstream of the chromatography column and upstream of a detector;
    a valve in fluid communication with an output of the chromatography column, wherein the valve is not in a direct flow path between the chromatography column and the detector; and
    a computing device configured to control an operation of the valve in order to:
        operate the valve in a first position configured to direct the output of the chromatography column to bypass the valve and reach the detector; and
        operate the valve in a second position configured to direct the output of the chromatography column to waste.

2. The system of claim 1, further comprising:
    a makeup pump configured to pump a makeup fluid into the chromatography system downstream of the chromatography column and upstream of the first restrictor.

3. The system of claim 2, wherein the makeup pump is configured to pump the makeup fluid at a flow rate that is less than a maximum flow rate of the first restrictor when the valve is operating in the first position.

4. The system of claim 2, wherein the makeup pump is configured to pump the makeup fluid at a flow rate that is greater than a maximum flow rate of the first restrictor when the valve is operating in the second position in order to generate a backflow of the makeup fluid upstream of the first restrictor.

5. The system of claim 1, wherein the valve is configured in the first position to divert a portion of output of the column to waste through a second restrictor having a pressure drop value much greater than that of the first restrictor.

6. The system of claim 1, wherein the valve is configured in the second position to divert a portion of output of the column to waste through a third restrictor having a pressure drop value much less than that of the first restrictor.

7. The system of claim 1, wherein the detector is a mass spectrometer.

8. The system of claim 1, wherein the detector is a flame ionization detector.

9. A system for controlling fluid flow within a chromatography system, the system comprising:
    a mobile phase pump configured to pump a liquid mobile phase through a chromatography column;
    a first restrictor positioned downstream of the chromatography column and upstream of a detector;
    a valve in fluid communication with an output of the chromatography column, wherein the valve is not in a direct flow path between the chromatography column and the detector, the valve configured to operate in a first position configured to direct the output of the chromatography column to bypass the valve and reach the detector or to operate in a second position configured to direct the output of the chromatography column to waste.

10. The system of claim 9, further comprising
a makeup pump configured to pump a makeup fluid into the chromatography system downstream of the chromatography column and upstream of the first restrictor;
wherein the makeup pump is configured to pump the makeup fluid at a flow rate that is less than a maximum flow rate of the first restrictor when the valve is operating in the first position, and is configured to pump the makeup fluid at a flow rate that is greater than a maximum flow rate of the first restrictor when the valve is operating in the second position in order to generate a backflow of the makeup fluid upstream of the first restrictor.

11. The system of claim 9, further comprising:
a second restrictor having a pressure drop value much greater than that of the first restrictor, wherein the valve is configured in the first position to divert a portion of the output of the chromatography column to waste through the second restrictor; and
a third restrictor having a pressure drop value much less than that of the first restrictor, wherein the valve is configured in the second position to divert a portion of the output of the chromatography column to waste through the third restrictor.

12. The system of claim 9, wherein the detector is a mass spectrometer.

13. The system of claim 9, wherein the detector is a flame ionization detector.

* * * * *